Aug. 20, 1935.  F. E. MUNSCHAUER  2,011,822
CUSHIONING MEANS FOR CLUTCHES
Filed April 8, 1933   3 Sheets-Sheet 1

F. E. Munschauer
INVENTOR
BY Popp & Powers
ATTORNEYS

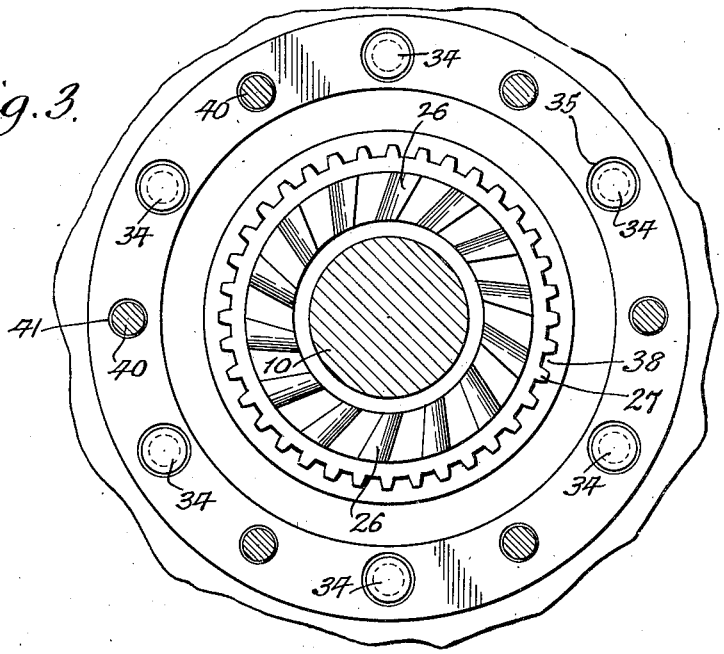
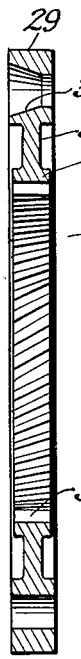
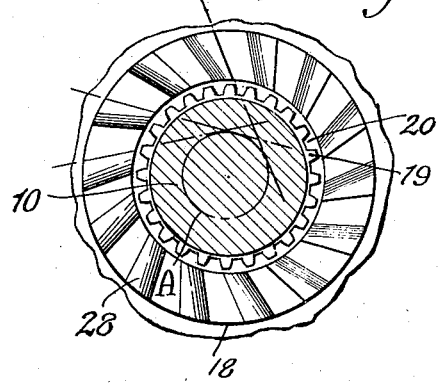

Patented Aug. 20, 1935

2,011,822

UNITED STATES PATENT OFFICE 2,011,822

CUSHIONING MEANS FOR CLUTCHES

Frederick E. Munschauer, Buffalo, N. Y., assignor to Niagara Machine & Tool Works, Buffalo, N. Y., a corporation of New York Application April 8, 1933, Serial No. 665,150

11 Claims. (Cl. 192—24)

This invention relates to a cushioning means for clutches which are adapted to couple and uncouple two relatively movable members and is more particularly intended to be employed in clutches for coupling the drive shaft of a high speed metal forming machine with a source of power although the invention can be advantageously incorporated in the clutches of high speed machines for other purposes. With the present demand for metal forming machines operating at higher and higher speeds, the clutches which have heretofore been designed for metal forming machines have proved inadequate. Not only are the former types of clutches extremely noisy when the speed at which the machine is operated is increased but the strain imposed upon the clutch and upon the other parts of the machine in stopping and starting its operation is so great as to cause excessive wear and frequent replacements, thereby overcoming the advantage obtained by driving the metal forming machine at an increased speed.

It is therefore the principal object of the present invention to provide cushioning means in the clutch structure which cushioning means are interposed between the driving clutch member and the main shaft of the metal forming machine and thereby absorb and relieve the strain on the clutch in rapidly coupling and uncoupling the main shaft of the machine with a power source. The cushioning means are also so designed as to materially reduce the noise of the clutch in engaging and disengaging and to insure a smooth and reliable engagement of the clutch jaws each time the clutch is operated.

Another object of the present invention is to provide such a cushioning means which absorbs the force of back lash strains upon the clutch and prevents the clutch from being accidentally thrown out because of such back lash strains.

Another aim is to provide such a cushioning means for a high speed clutch which will stand up under heavy loads and is ruggedly constructed so as not to require repair, adjustment or replacements even under conditions of constant and steady service.

Another purpose is to provide such a cushioning means for a clutch in which positive limit stops are provided to limit the action of the cushioning means and insure a positive drive through the clutch as well as avoiding undue strain upon the cushioning means and undue rebound action of the cushioning means.

Other objects are to provide such a cushioning means for high speed clutches which is simple in construction and composed of few parts and can be manufactured and assembled at low cost.

In the accompanying drawings:

Figs. 3 and 4 are vertical cross sections taken on the correspondingly numbered lines of Fig. 1.

Fig. 5 is a vertical section of the outer cushion member or rim of the clutch mechanism shown in Figs. 1 and 3.

In the following description similar characters of reference indicate like parts in the several figures of the drawings.

Figure 1:
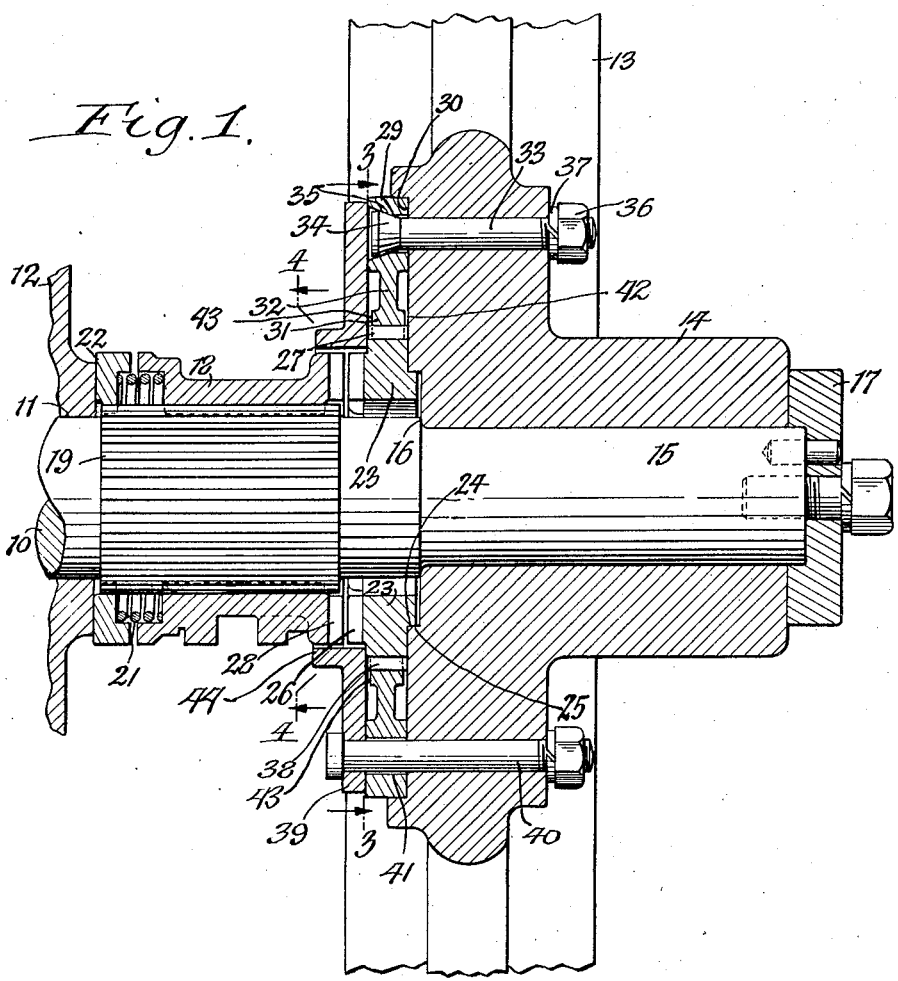
Fig. 1 is a fragmentary vertical longitudinal section of the clutch mechanism for a metal forming machine embodying one form of my invention.
Figure 2:
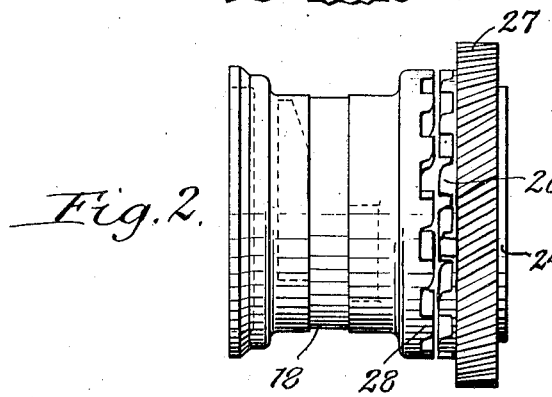
Fig. 2 is a side elevation of the clutch sleeve and inner cushion member or ring of the clutch mechanism which cooperates with the clutch sleeve and with the other parts of the cushioning device.

Although the cushioning means of the present invention is applicable to clutch mechanisms of various kinds of machines, it is particularly intended for use in connection with high speed metal forming machines in which the clutch mechanism is in constant repeated service and by way of illustration of one of its uses is shown as driving the horizontal main or drive shaft 10 of a metal forming machine such as a punch press, power shears or the like, this main or drive shaft 10 being journaled in a suitable bearing 11 on the frame 12 of the forming machine. The clutch is shown as interposed between this main or drive shaft 10 and a driving pulley 13 which is adapted to be rotated either by a belt (not shown) or otherwise from any suitable source of power. The hub 14 of the driving pulley is mounted on the reduced outer end 15 of the main or drive shaft 10 and this hub is shown as being rotatably secured on the end 15 of the drive shaft by a retaining plate 17 which holds the hub 14 against the shoulder 16 of the drive shaft. It will be understood, however, that the particular manner of mounting the pulley 13 on the reduced end 15 of the main drive shaft is by way of example only and that ball or roller bearings could be substituted for the bearings shown, in which case a different form of retaining means between the pulley and the drive shaft would necessarily be required.

When the machine is idle the pulley 13 is uncoupled from the drive shaft 10 and its hub turns freely on the reduced part 15 of the shaft so that the working parts of the machine remain at rest, but upon coupling the shaft with the driving pulley power is transmitted to the working parts of the machine to complete a forming operation.

The clutch mechanism which is shown in Figs. 1-5 represents one form of my invention, and as there shown the same is constructed as follows:

The numeral 18 represents a clutch sleeve which is mounted on and compelled to turn with the main drive shaft 10 but is free to slide thereon by means of a plurality of longitudinal splines 19 annularly disposed on the shaft 10 and engaging with corresponding longitudinal splines 20 in the bore of the clutch sleeve 18. Any suitable means may be provided for moving this clutch sleeve into and out of its operative position and in the present case the organization is such that when the sleeve is moved outwardly or forwardly the clutch operates to couple the pulley with the drive shaft and when the clutch sleeve is moved inwardly or rearwardly the clutch mechanism operates to disconnect the pulley from the drive shaft. The pulley is continuously rotating and consequently the engagement or disengagement of the clutch causes the shaft to be revolved accordingly.

Any suitable means can be employed for moving the clutch sleeve outwardly or forwardly into its operative position, and as illustrated, these means consist of a projecting helical compression spring 21 disposed at the rear or outer end of the clutch sleeve 18 and a bearing disk 22 interposed between the rear end of the spring and the adjacent bearing 11 on the main frame in which the main or drive shaft 10 is journaled. For coupling the clutch this spring 21 moves the clutch sleeve outwardly and cooperates with other parts for connecting the driving pulley with the main or drive shaft and when it is desired to uncouple the pulley and shaft, the clutch sleeve is moved rearwardly or inwardly into its inoperative position, as shown in Fig. 1, which rearward movement of the sleeve 18 can be effected by any suitable and approved means now in common use, such as is shown in the co-pending application of Paul R. Hahnemann and Frederick E. Munschauer, Clutch for punch presses or the like, filed April 18, 1932, Serial No. 605,931.

Instead of effecting a positive, unyielding connection between the clutch sleeve 18 and the pulley 13, as is commonly the case, this connection is effected by means which provide a cushioning or shock absorbing action which absorbs the shock of coupling the stationary drive shaft with the rotating pulley and thereby eases the strain upon the clutch as well as reducing the noise of engagement, reducing undesirable back lash action and providing a smoother and more positive engagement between the coupling jaws. The cushioning means shown in Figs. 1-5 includes an inner cushion ring 23 which is made of steel or other suitable metal and surrounds the drive shaft 10 which is arranged between the rear side of the hub 14 of the driving pulley and the front or outer side of the clutch sleeve 18. The bore of this ring is preferably spaced from the shaft 10 and is preferably held concentric with the axis of the drive shaft 10 by providing the front side of this inner cushion ring with an annular neck 24 which sets in an annular recess 25 formed on the rear side of the pulley hub 14. On its rear side this inner cushion ring 23 is provided with an annular row of clutch or coupling jaws 26 and on its periphery this inner cushion ring 23 is provided with an annular row of cushion or relief teeth 27. On the corresponding front or outer end the clutch sleeve 18 is provided with an annular row of clutch jaws 28 which are adapted to be moved into and out of engagement with the clutch jaws of the inner cushion ring 23 for the coupling and uncoupling of the pulley and drive shaft. The cooperating or driving faces of the clutch jaws 26 and 28 of the inner cushion ring 23 and the clutch sleeve 18 are parallel with the axis of the drive shaft 10 and are disposed at a constant angle to the radii of the shaft generated through, say, the center of each jaw. In other words, the planes of the driving faces of the jaws are tangential to a circle, indicated at A, generated within the jaws and concentric with the shaft. In the same manner the trailing faces of the jaws, while not disposed in their entirety parallel to the axis of the drive shaft, are also arranged tangential to the same assumed circle A or are disposed at the same angle relative to the radius of the shaft. This form of jaws, as compared with radially disposed teeth, not only provides jaws having more metal in the direction of the strain against them but also provides a wedging action of the two sets or rows of jaws which has the effect of compressing the metal of the teeth to such an extent that a cushioning or resilient effect is produced. This wedging action is due, by actual test, to the yield of the jaws when subjected to the sudden and heavy load and backlash strains. Without such yield of the jaws, no wedging action could, of course, occur and the yield of the teeth is increased by their mutual wedge action. Many clutches embodying this feature of the invention have been in continuous service and the cushioning action of the inclined jaws is remarkably effective in relieving load and backlash strains. The wedging action of the teeth, through their actually yielding, also provides a frictional resistance to the relative rotation of the driving and driven members coupled by the clutch, thereby providing a frictional cushioning means between these elements and absorbing a part of the strain of impact when a load is imposed on the clutch in coupling it. It will be appreciated that the jaws of every positive clutch must yield in order to provide the time necessary to transmit the force from a rapidly rotating pulley or flywheel to a stationary load. Without this yield and time element in the application of the power to the load, the strain would be infinite and the clutch immediately break. The present invention is designed to take the greatest advantage of this inherent yield and increase its effect so as to be effective as a cushioning means inherent to the clutch.

The form of the jaws 26 and 28 is such that they will freely engage when the sleeve 18 is moved toward the ring 23 which, of course, rotates with the pulley, and at the same time will positively transmit both driving and backlash strains when engaged. In order to permit the jaws to freely engage, clearance between the jaws is provided by rounding the outer part of the trailing face of each jaw so that these faces merge with the end faces of the jaws. The driving faces of the jaws, are, however, parallel with the axis of the clutch so as to provide a positive drive and the inner part of the trailing face of each jaw is also parallel with this axis or less than the angle of repose so that when these faces engage (under backlash strains on the clutch), these trailing faces likewise become positive pressure transmitting means.

Surrounding the inner cushion ring 23 and secured to the adjacent part of the pulley hub 14 is an outer cushion ring which is also made of steel or like material and comprises an outer or peripheral portion 29, a somewhat narrower inner or bore part 31 and an integrally formed comparatively thin and flexible or resilient intermediate web 32 connecting the peripheral and bore parts. The relatively wide, outer or peripheral part 29 of this outer cushion ring is secured to the hub 14 of the driving pulley and to hold this in centered relation to the drive shaft and other parts of the clutch is preferably set within a recess 30 in the rear side of the hub 14. This ring is rigidly connected, through its relatively wide peripheral portion with the hub of the pulley by a plurality of connecting bolts, each of which passes with its shank 33 through the pulley hub and is provided at its rear end with a conical head 34 which engages with a correspondingly shaped opening 35 in the adjacent part of the relatively wide outer rim 29 of this cushion ring and holds this outer rim against the rear face of the hub. The bolts are provided with the usual nuts 36 at their front ends which bear against lock washers 37 and draw the outer cushion ring firmly against the hub of the pulley. In its bore, the outer cushion ring is provided with an annular row of relief teeth 38 which are in permanent mesh with the relief teeth 27 on the inner cushion ring, as shown in Figs. 1 and 3. These teeth 27 and 38 are preferably of helical form so that upon coupling the sleeve clutch the cooperating inclined faces will produce a wedging action which will drive the inner part 31 of the outer cushion ring axially and flex the intermediate web 32 of this ring. This axial movement of the inner part 31 of the outer coupling ring is, of course, resisted by the resilient web 32 and is also resisted by the friction of the teeth and thereby provides an additional yielding or cushion effect between the driven and driving elements of the clutch. In addition, of course, there is a resilient compression of the metal of the teeth 27 and 38 which provides a further cushioning effect. The axial movement of the inner rim 31 of the outer cushion ring is limited so that under both driving and rebound strains the outer cushion ring can be flexed to a predetermined degree only and thereafter a positive or unyielding drive obtained through this outer cushion ring. For this purpose the inner rim 31 of the outer cushion ring, when at rest, is spaced to provide a predetermined gap 42 which limits the axial outward movement of the inner rim 31 or toward the hub 14 of the driving pulley. The movement of the inner rim 31 of the outer cushion ring in the opposite direction is limited by the provision of a predetermined gap 43 between the corresponding side of the inner part 31 of the outer cushion ring and a retaining ring or member 39 which is secured to the relatively wide outer rim 29 of this outer cushion by a plurality of bolts 40. The shank of each of these bolts 40 is tightly fitted in the hub 14 of the driving pulley and the retaining ring 39 but passes through a slightly enlarged opening 41 in the outer rim portion 29 of the outer cushion ring, as shown in Fig. 1. The retaining ring 39 is also preferably provided with a rearwardly projecting inner or annular flange 44, which flange encloses the jaws of the clutch sleeve 18 and the inner cushion ring 23. It has been found that this flange 44 greatly reduces the noise of engagement of the jaws and, when packed with grease, practically eliminates all noise in the clutch.

The helical inclination of the driving faces of the relief teeth 27, 38 is preferably such that when a wedging action is produced by these several teeth, upon coupling the pulley with the drive shaft while the latter is at rest, this wedging action will operate to deflect and press the inner or bore portion 31 of the outer cushion ring against the corresponding face of the retaining ring 39, thereby closing the gap 43 and obtaining a positive drive through the clutch. The helical inclination of the non-driving faces of these teeth is also preferably such that under excessive rebound strains the inner rim 31 of the outer cushion ring will be driven against the hub 14 and thereby close the gap 42. When at rest the inner rim 31 of the outer cushion ring assumes its central position with the gaps 42 and 43 at its opposite sides.

This flexing of the inner rim 31 of the cushion ring is only possible, of course, because the pressure transmitting faces on both the driving and trailing sides of each jaw 26 and 28 are parallel with the axis of the clutch, or nearly so, and thereby positively transmit both load and backlash strains to one another. If either of these pressure transmitting faces of the jaws were at an angle greater than their angle of repose, the strain either under load or backlash would, of course, force the collar against the resistance of spring 21 and disengage the clutch instead of flexing the web 32.

From the foregoing explanation it is apparent that a yielding action is obtained in transmitting the blow of a continuously rotating pulley 13 to the drive shaft 10 when the clutch is coupled, which blow is taken up partly by the frictional resistance of the cooperating inclined faces of the relief teeth 27 and 38 on the inner and outer cushion rings; also by the frictional resistance of the cooperating inclined surfaces of the clutch jaws 26, 28; also by the yielding of the metal of these teeth and jaws; also by the internal flexibility of the outer cushion ring; also by the internal flexibility of the retaining ring 39 and also by the yielding of the bolts 40 which secure the retaining ring 39. This flexibility or yielding action occurs under both driving and rebound strains and is particularly effective in avoiding the delivery of a dead blow and undue strain through the clutch when the clutch is suddenly coupled to start the machine and also avoids unnecessary wear and noise which has accompanied the coupling action of clutches on machines of this character as heretofore constructed.

Figure 6:
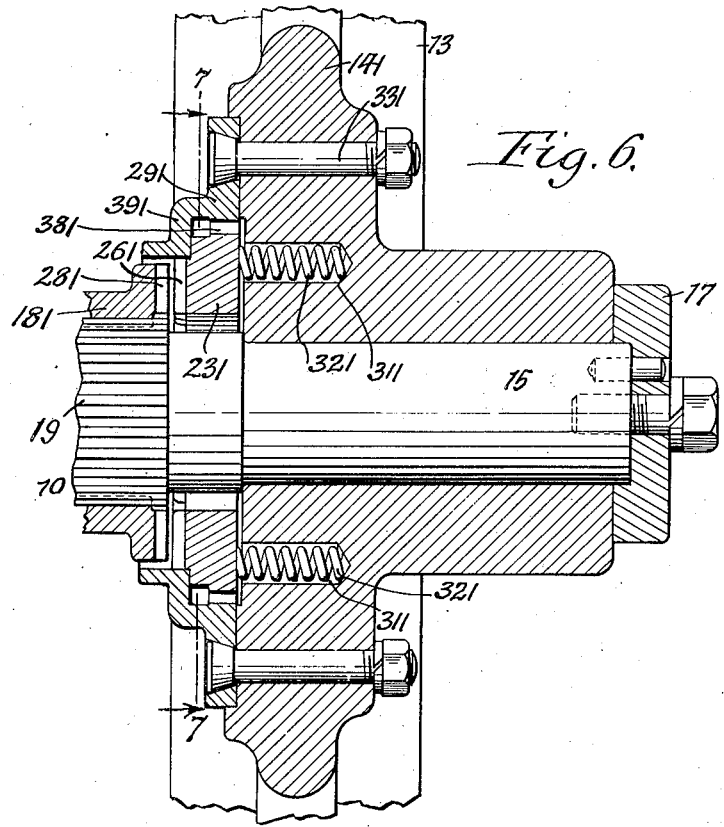
Fig. 6 is a vertical longitudinal section, similar to Fig. 1, but showing a modified form of my invention.
Figure 7:
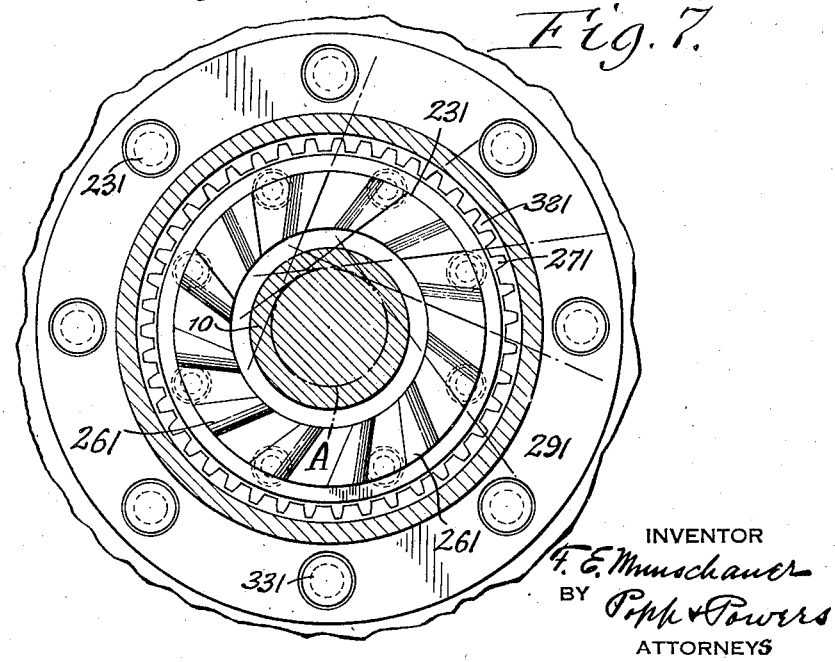
Fig. 7 is a vertical transverse section, taken on line 7—7, Fig. 6.

In the modified form of my invention as shown in the constructions represented in Figs. 6 and 7 the outer cushion ring 291 is secured to the rear side of the hub 141 of the driving pulley by means of bolts 331 and is provided in its bore with an annular row of helical relief teeth 381 which engage with a corresponding annular row of helical relief teeth 271 on the periphery of an inner cushion ring 231. The latter is arranged between the rear side of the hub of the driving pulley and a retaining flange 391 formed integrally with and projecting inwardly from the outer cushion ring 291. This retaining flange 391 is preferably formed to enclose the jaw teeth of the clutch to avoid noise in coupling the clutch. The inner cushion ring 231 is provided on its rear side with an annular row of clutch jaws 261 which are formed in the same manner as the clutch jaws 26 in the form of the invention shown in Figs. 1–5 and are adapted to be engaged by a similar row of clutch jaws 281 on the front end of the clutch sleeve 181. The inner cushion ring 231 is free to move axially to a limited extent relative to the driving pulley and drive shaft 10 and is preferably held in its rearmost position against the front side of the flange 391 by spring means which preferably consist of a plurality of helical compression springs 321, each of which is seated in a socket 311 on the rear side of the driving pulley hub and engages with the front side of the inner cushion ring 231, as shown in Fig. 6.

The cooperating relief teeth 271 and 381 and the clutch jaws 261 and 281, by reason of their angular relation, cooperate with each other frictionally and provide a wedge action, as described with reference to the corresponding teeth and jaws in the form shown in Fig. 5.

The helical teeth of the inner and outer friction rings 291 and 231 can, of course, be disposed so that the springs 321 are compressed either under a driving blow or under a rebound blow. In either case the forward movement of the inner clutch ring 231 through the wedging action of its teeth 271, is yieldingly resisted by the springs 321 which function until the inner cushion ring 231 is driven against the adjacent face of the hub of the pulley. The opposite or rearward movement of the inner cushion ring 231 is yieldingly resisted by the flange 391 of the outer cushion ring 291, this flange 391 having inherent flexibility.

By arranging the helical teeth of the inner and outer cushion rings 231 and 291 so that the inner cushion ring 231 is driven rearwardly or against the flange 391 under coupling strains the springs 321 can be eliminated and sufficient dampening action of the blow obtained by the yield of the metal of the jaws 281 and 261 and the frictional sliding of these jaws to one another; the yield of the metal of the helical teeth 271 and 381 relative to one another and their frictional movement relative to one another; and the yield of the inner cushion ring 231 backwards.

The relief teeth can be generated or cut with a broad pressure angle, say 45° or even more, thus producing a wedging action of the teeth themselves independent of any helical angle. Experimental parts of 45° pressure angle and 45° helical angle are now being formed. These teeth, of course, can be involute or merely inclined planes or of other contours.

Both of the forms of cushioning devices herein shown and described are comparatively simple in construction, low in cost of manufacture, are unlikely to get out of order and are capable of being installed where a small amount of space is available and a compact organization is required.

I claim as my invention:

1. A positive drive clutch for coupling and uncoupling two relatively rotatable members, comprising a driving element permanently connected to one of said members, a driven element positively connected to the other member, said elements being coaxial and movable axially relatively to one another and each having a multiplicity of face jaws projecting axially from its end face, said jaws being adapted to engage with and disengage from one another to couple and uncouple the clutch and provide a positive drive in either direction of rotation, the driving pressure faces of said jaws being substantially parallel with the axis of said elements and inclined relative to the radii of said elements thereby to produce a tangential wedging action of said jaws upon rotating said elements to transmit pressure from one element to the other.

2. A positive drive clutch for coupling and uncoupling two relatively rotatable members, comprising a driving element permanently connected to one of said members, a driven element positively connected to the other member, said elements being coaxial and movable axially relatively to one another and each having a multiplicity of face jaws projecting axially from its end face, said jaws being adapted to engage with one another and positively transmit pressure upon rotating said elements in either direction, the driving pressure faces of said jaws being substantially parallel with the axis of said elements and inclined at a constant angle to the radii of said elements thereby to produce a tangential wedging action between said jaws upon transmitting driving pressure from said driving element to said driven element and the opposite faces of said jaws being also inclined at a constant angle to the radii of said elements to produce a tangential wedging action between said jaws upon transmitting backlash pressures from said driven to said driving element.

3. A positive drive clutch for coupling and uncoupling two relatively rotatable members, comprising a driving element permanently connected to one of said members, a driven element positively connected to the other member, said elements being coaxial and movable axially relatively to one another and each having a multiplicity of face jaws projecting axially from its end face, said jaws being adapted to engage with one another and positively transmit pressure upon rotating said elements in either direction, the driving pressure faces of said jaws being substantially parallel with the axis of said elements and inclined at a constant angle to the radii of said elements thereby to produce a tangential wedging action between said jaws upon transmitting driving pressure from said driving element to said driven element and the opposite faces of said jaws being also inclined at a constant angle to the radii of said elements to produce a tangential wedging action between said jaws upon transmitting backlash pressures from said driven to said driving element and said last named faces being also rounded to permit ready engagement of said jaws.

4. A positive drive clutch adapted to transmit power in either direction for coupling and uncoupling two relatively movable members, comprising a driving element and a driven element, means connecting one of said elements with one of said members and positive means for coupling and uncoupling the other of said elements with the other movable member, said driving and driven elements having a plurality of teeth extending radially therefrom and permanently in mesh with one another, the pressure faces of said teeth being inclined so as to produce a helical wedging action therebetween.

5. A positive drive clutch adapted to transmit power in either direction for coupling and uncoupling two relatively movable members, comprising a driving element and a driven element, means connecting one of said elements with one of said members and positive means for coupling and uncoupling the other of said elements with the other movable member, said driving and driven elements each having a plurality of integral teeth extending radially therefrom and being permanently in mesh with the teeth of the other element, the pressure faces of said teeth being helically inclined so as to produce a helical wedging action therebetween and said wedging action moving one of said elements axially, and means yieldingly resisting the said axial movement of said element.

6. A positive drive clutch adapted to transmit power in either direction for coupling and uncoupling two relatively movable members, comprising a driving element and a driven element, means connecting one of said elements with one of said members and positive means for coupling and uncoupling the other of said elements with the other movable member, said driving and driven elements each having a plurality of integral teeth extending radially therefrom and being permanently in mesh with the teeth of the other element, the pressure faces of said teeth being helically inclined so as to produce a helical wedging action therebetween, and said wedging action moving one of said elements axially, means yieldingly resisting the said axial movement of said element, and means forming a positive limit stop for said axial movement of said element.

7. A positive drive clutch adapted to transmit power in either direction for coupling and uncoupling two relatively rotatable members, comprising a ring element having a row of integral radially extending teeth, an element having a row of integral radially extending teeth meshing permanently with the teeth of said ring element, means connecting one of said elements with one of said members and positive jaw means for coupling and uncoupling the other of said elements with the other rotatable member, the faces of said teeth being helically inclined so as to produce a wedging action and cushion the strains in either direction of drive.

8. A positive drive clutch adapted to transmit power in either direction for coupling and uncoupling two relatively rotatable members, comprising a ring element having a plurality of integral, radially extending, helically inclined teeth, an element having a plurality of integrally, radially extending, helically inclined teeth permanently meshing with the teeth of said ring element, means connecting one of said elements with one of said members, positive jaw means for coupling and uncoupling the other of said elements with the other rotatable member, said teeth producing a helical wedging action and urging the corresponding part of one of said elements axially, and means yieldingly resisting said axial movement.

9. A positive drive clutch adapted to transmit power in either direction for coupling and uncoupling two relatively rotatable members, comprising a ring element having a row of integral, radially extending, helically inclined teeth, an element having a row of integral radially extending, helically inclined teeth permanently meshing with the teeth of said ring element, means connecting one of said elements with one of said members, positive jaw means for coupling and uncoupling the other of said elements with the other movable member whereby said teeth produce a helical wedging action tending to drive one of said elements axially, and yielding means permitting a limited axial movement of said ring element.

10. A clutch for coupling and uncoupling two relatively rotatable members, comprising a ring element secured to one of said members and having inclined teeth, an axially movable element having inclined teeth permanently meshing with said inclined teeth of said ring element whereby said teeth produce a wedging action driving said axially movable element axially, a flange carried by said first named rotatable member and limiting the axial movement of said axially movable element away therefrom, spring means interposed between said first named rotatable member and said axially movable element and holding said axially movable element against said flange and means for coupling and uncoupling said axially movable element and the other rotatable member.

11. A clutch for coupling and uncoupling two relatively rotatable members comprising an annular row of helical teeth mounted coaxially on one of said members to turn therewith, a ring having an annular row of helical teeth permanently meshing with the first helical teeth, said ring being also provided with axially extending jaws, an element rotatable with the other rotatable member and having jaws engaging the jaws of said ring, the faces of said jaws being inclined so as to produce a wedging action therebetween upon moving said members in the direction in which pressure is transmitted through said jaws and the helical arrangement of said teeth likewise producing a wedging action and means for yieldingly resisting the axial movement of said ring under the influence of said wedging action.

FREDERICK E. MUNSCHAUER.